Dec. 21, 1926.
A. LEPINTE
1,611,353
SAFETY DEVICE FOR AEROPLANES
Filed Feb. 16, 1925    2 Sheets-Sheet 1
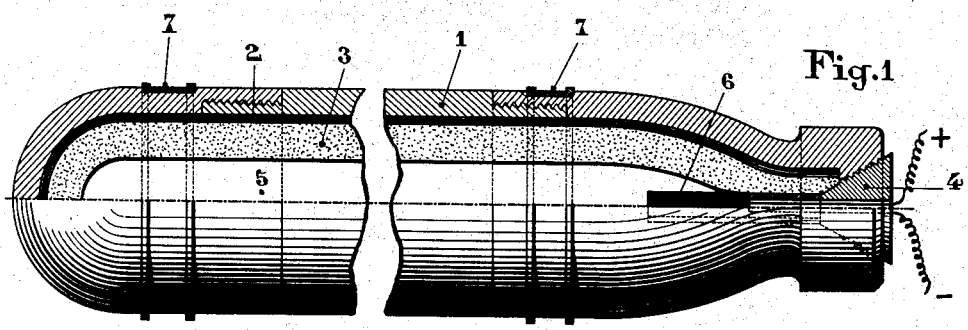
Fig. 1
Fig. 3
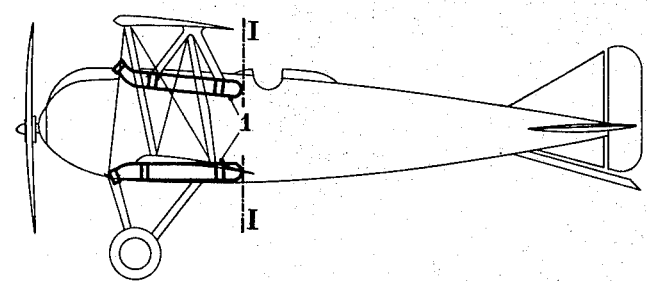
Fig. 5
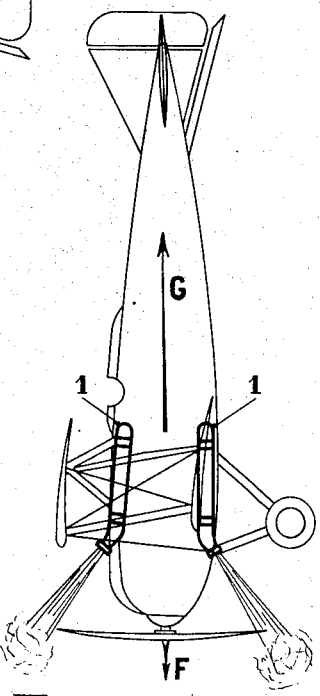
Fig. 4
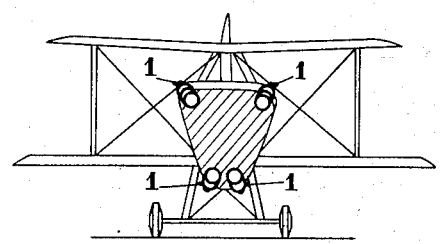
Inventor
A. Lepinte
by Langner, Parry, Card & Langner
Att'ys.

Dec. 21, 1926.
A. LEPINTE
1,611,353
SAFETY DEVICE FOR AEROPLANES
Filed Feb. 16, 1925   2 Sheets-Sheet 2
Fig. 2
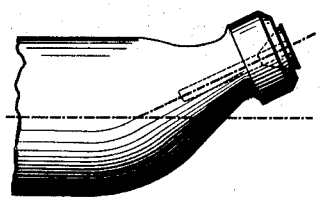
Fig. 6
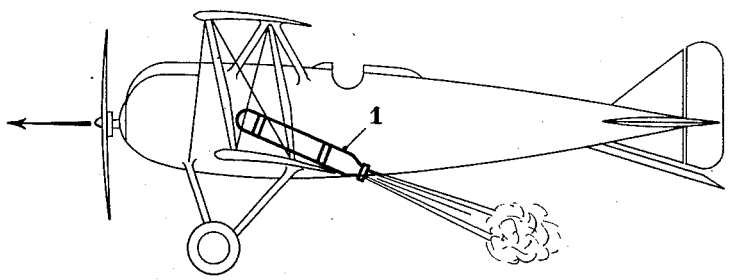
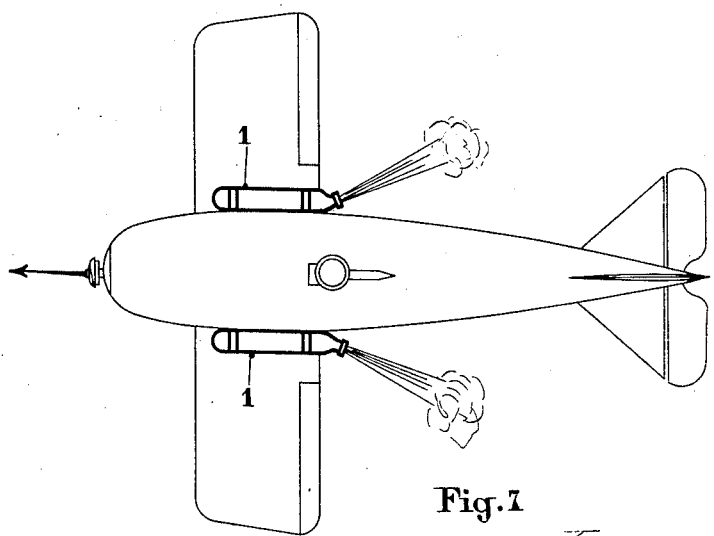
Fig. 7
Inventor
A. Lepinte
by Langner, Parry, Card & Langner
Attys.

Patented Dec. 21, 1926.

1,611,353

UNITED STATES PATENT OFFICE.

ALBERT LEPINTE, OF MELUN, FRANCE.

SAFETY DEVICE FOR AEROPLANES.

Application filed February 16, 1925, Serial No. 9,688, and in France February 19, 1924.

The present invention has for its subject an apparatus applicable to aeroplanes for the purpose of increasing the safety thereof. The invention particularly permits of retarding the speed of falling of an aeroplane in distress falling freely or imparting temporarily to the aeroplane a speed sufficient to enable it to recover itself and land normally.

The apparatus forming the subject of the invention is essentially characterized by the application of a device wherein is promoted, by any suitable means, the production of a certain volume of gas under a very high pressure (pressure of the order of 1000 to 2000 kilograms per square centimeter) this device being arranged in such a manner as to enable the gas thus formed to escape through a nozzle of small section. By a reaction force the flow of gas under pressure gives rise to a force which, according to the direction of the said nozzle, may be decelerating or accelerating. In other words the invention constitutes the new application of a fuse, the result obtained by this application consisting in the modification of the conditions of falling of an aeroplane in distress.

The gas under high pressure can be produced in the safety device either by the combustion of a charge of powder of suitable composition or by any other means.

In the accompanying drawing there is illustrated in an absolutely diagrammatic manner and by way of example only, a form of construction of the apparatus forming the subject of the invention and two applications of the said apparatus.

Figure 1 is a view in elevation with a half longitudinal section of one of the gas generating devices.

Figure 2 shows a particular arrangement of the nozzle for the outflow of the gas.

Figure 3 shows a side elevation of an aeroplane provided with the safety device forming the subject of the invention.

Figure 4 is a section on the line I—I of Figure 3.

Figure 5 shows the effect produced by the apparatus of an aeroplane falling freely.

Figure 6 is an elevation, and

Figure 7 is a plan view of an aeroplane equipped with apparatus arranged in such a manner as to impart to the aeroplane a positive acceleration, that is to say to enable an aeroplane when losing speed to re-establish itself and land normally.

The safety device mounted on the aeroplane includes a suitable number of gas generating devices which are mounted on the aeroplane in different ways according to the result to be obtained.

Each of the gas generating devices consists of a hollow steel cylinder constructed so as to be capable of resisting very high pressures, the cylinder being adapted to communicate with the atmosphere by a nozzle of suitable section normally closed by a plug arranged in such a manner as to resist the pressure of the gas until a certain limit is reached so that this pressure will then produce automatically the discharge of the plug.

Figure 1 shows by way of example a construction of such a device. It comprises a hollow steel cylinder 1 coated internally with two jackets one of which 2 is of asbestos, the other 3 being of silica or refractory porcelain. This cylinder is closed at one end and terminates at the other in a nozzle into which is screwed the plug 4. In the chamber 5 formed in the interior of the cylinder 1 is located a charge of powder of suitably determined composition. The ignition of this charge may be produced by means of a suitable device 6 carried by the plug 4. The screw thread by means of which the plug is screwed into the nozzle of the cylinder is constructed in such a manner that the said plug can only be discharged under a sufficiently high pressure (1000 to 2000 kilograms per square centimeter). This pressure is necessary to ensure good combustion of the powder and it has from the first also the result of increasing the efficiency of the apparatus.

The cylinder is provided with strengthening rings 7, 7 by means of which it may be secured to the fuselage of the aeroplane.

The nozzle of each of the gas generating devices is preferably slightly bent as shown in Figure 2 in such a manner that the discharge of gas will be away from the aeroplane on which the safety device is mounted.

In the application of the device shown in Figures 3 to 5, the aeroplane is provided with four cylinders 1 having their nozzles turned towards the front and towards the rear (it will be understood that the number of cylinders is only given by way of example and that it is possible without modifying the economy of the invention to utilize any suitable number of cylinders). When the apparatus thus equipped is found in distress and falls freely then at the moment at which the pilot wishes the safety device to act he produces electrically the ignition of the powder contained in the cylinders 1.

As soon as the pressure produced by the combustion of the powder reaches the prescribed value the plugs 4 are driven out and the escape of gas takes place at a very high pressure through the nozzles (see Figure 5) and gives rise to forces having as resultant a force G directed vertically upwards and opposing the action F of the weight. The falling of the apparatus is thus retarded and the aeroplane falls vertically at a speed which, during the operation of the device, may be reduced to a very considerable extent.

The safety device forming the subject of the invention may also be applied in the manner shown in Figures 6 and 7. In this case the gas cylinders or chambers 1, placed to the right and to the left of the fuselage and at the front thereof (see Figure 7), have their nozzles turned towards the rear. These cylinders are slightly inclined to the horizontal as indicated in Figure 6 in such a manner that the impulse due to the escape of gas at a very high pressure has at the same time a sustaining and a propelling action. In the same manner as in the first application, the nozzles through which the gas escapes are slightly directed away from the fuselage so that the projection of ignited gases will not be dangerous for the apparatus.

When an aeroplane thus equipped is in danger by reason of a loss in speed the pilot may, by actuating the safety device, impart temporarily to his apparatus a speed sufficient to enable him to re-establish himself and land normally.

Having thus described my invention what I claim as new and desire to secure by Letters Patent is:—

1. Safety apparatus for aeroplanes, comprising, in combination, an aeroplane, means for temporarily imparting to the aeroplane in distress a negative or positive acceleration for the purpose of either retarding the speed of falling of the aeroplane or for imparting to it temporarily a speed so that it may re-establish itself and land normally, said device including, a charged cartridge, and means for igniting the charge in the cartridge for producing gases to produce the said acceleration.

2. A safety apparatus for aeroplanes, comprising, in combination, an aeroplane, a gas generator secured to the aeroplane, the generator comprising, a hollow cylinder having walls capable of resisting pressures up to approximately 2000 kilograms per square centimeter, an asbestos lining in the cylinder, a charge of ignitable powder in said cylinder, means for igniting said charge, a plug for closing one end of the cylinder and arranged to be discharged from the cylinder to allow the gases to escape when the pressure of gas inside the cylinder reaches approximately 2000 kilograms per square centimeter.

3. Safety apparatus for use in aeroplanes comprising a plurality of cylinders open at one end, means for attaching said cylinders to the fuselage of the aeroplane, said cylinders having nozzles which are directed away from the aeroplane, some of said nozzles projecting forwardly and some rearwardly on the aeroplane, an asbestos and refractory lining in the interior of each of said cylinders, and inflammable powder inside said cylinders, said powder being adapted when ignited to generate a gas at a high pressure, a plurality of plugs one disposed in each nozzle and normally closing the same, an igniting device mounted in each plug and adapted to ignite the powder, and means for actuating said igniting device for the purpose of igniting the powder, the plug being adapted to be discharged from the nozzle so as to allow the gas to escape when said gas reaches a pressure of about 2000 kilograms per square centimeter.

4. In combination with an aeroplane of gas generating cylinders in which a gas is adapted to be generated at a high pressure, said gas being adapted to be discharged from said apparatus towards the rear for imparting an accelerated movement to the aeroplane, and towards the front of the aeroplane for the purpose of applying a retarding action to said aeroplane when it is falling vertically.

ALBERT LEPINTE.